United States Patent
Parikh et al.

(10) Patent No.: US 12,014,214 B2
(45) Date of Patent: *Jun. 18, 2024

(54) TILE SUBSYSTEM AND METHOD FOR AUTOMATED DATA FLOW AND DATA PROCESSING WITHIN AN INTEGRATED CIRCUIT ARCHITECTURE

(71) Applicant: Mythic, Inc., Austin, TX (US)

(72) Inventors: Malav Parikh, Austin, TX (US); Sergio Schuler, Austin, TX (US); Vimal Reddy, Austin, TX (US); Zainab Zaidi, Austin, TX (US); Paul Toth, Austin, TX (US); Adam Caughron, Austin, TX (US); Bryant Sorensen, Austin, TX (US); Alex Dang-Tran, Austin, TX (US); Scott Johnson, Austin, TX (US); Raul Garibay, Austin, TX (US); Andrew Morten, Austin, TX (US); David Fick, Cedar Park, TX (US)

(73) Assignee: Mythic, Inc., Austin, TX (US)

( * ) Notice: Subject to any disclaimer, the term of this patent is extended or adjusted under 35 U.S.C. 154(b) by 562 days.

This patent is subject to a terminal disclaimer.

(21) Appl. No.: 17/231,089

(22) Filed: Apr. 15, 2021

(65) Prior Publication Data

US 2021/0232435 A1    Jul. 29, 2021

Related U.S. Application Data

(63) Continuation of application No. 17/102,643, filed on Nov. 24, 2020, now Pat. No. 11,016,810.

(Continued)

(51) Int. Cl.
*G06F 9/50* (2006.01)
*G06F 9/48* (2006.01)
*G06N 3/045* (2023.01)
*G06F 7/544* (2006.01)
*G06F 7/57* (2006.01)

(Continued)

(52) U.S. Cl.
CPC .......... *G06F 9/5027* (2013.01); *G06F 9/4843* (2013.01); *G06N 3/045* (2023.01);
(Continued)

(58) Field of Classification Search
CPC .... G06F 9/5027; G06F 9/4843; G06F 7/5443; G06F 7/57; G06F 9/3001; G06F 9/5061; G06F 15/7807; G06N 3/045
See application file for complete search history.

(56) References Cited

U.S. PATENT DOCUMENTS

| | | |
|---|---|---|
| 7,506,134 B1 | 3/2009 | Juffa et al. |
| 2004/0049672 A1 | 3/2004 | Nollet et al. |

(Continued)

OTHER PUBLICATIONS

International Application No. PCT/US2016/061928, International Search Report and Written Opinion dated Feb. 11, 2021, 8 pages.

(Continued)

*Primary Examiner* — Wissam Rashid
(74) *Attorney, Agent, or Firm* — Padowithz Alce; Alce PLLC

(57) ABSTRACT

A system and method for a computing tile of a multi-tiled integrated circuit includes a plurality of distinct tile computing circuits, wherein each of the plurality of distinct tile computing circuits is configured to receive fixed-length instructions; a token-informed task scheduler that: tracks one or more of a plurality of distinct tokens emitted by one or more of the plurality of distinct tile computing circuits; and selects a distinct computation task of a plurality of distinct computation tasks based on the tracking; and a work queue buffer that: contains a plurality of distinct fixed-length instructions, wherein each one of the fixed-length instructions is associated with one of the plurality of distinct computation tasks; and transmits one of the plurality of distinct fixed-length instructions to one or more of the (Continued)

plurality of distinct tile computing circuits based on the selection of the distinct computation task by the token-informed task scheduler.

19 Claims, 4 Drawing Sheets

Related U.S. Application Data

(60) Provisional application No. 63/049,674, filed on Jul. 9, 2020, provisional application No. 62/940,518, filed on Nov. 26, 2019.

(51) Int. Cl.
*G06F 9/30* (2018.01)
*G06F 15/78* (2006.01)

(52) U.S. Cl.
CPC .............. *G06F 7/5443* (2013.01); *G06F 7/57* (2013.01); *G06F 9/3001* (2013.01); *G06F 9/5061* (2013.01); *G06F 15/7807* (2013.01)

(56) References Cited

U.S. PATENT DOCUMENTS

| | | |
|---|---|---|
| 2005/0163117 A1 | 7/2005 | Rhim et al. |
| 2008/0178179 A1 | 7/2008 | Natarajan et al. |
| 2010/0199246 A1 | 8/2010 | Huynh et al. |
| 2010/0262973 A1 | 10/2010 | Ernst et al. |
| 2010/0281483 A1* | 11/2010 | Rakib .................... G06F 9/3828 |
| | | 712/30 |
| 2011/0307685 A1 | 12/2011 | Song |
| 2013/0103977 A1* | 4/2013 | Zimmermann ..... G06F 11/0751 |
| | | 714/4.11 |

OTHER PUBLICATIONS

Cohen et al., "Mapping and Scheduling on Multi-core Processors using SMT Sol-vers," United Technologies Research Center, 2014, 41 pages.

* cited by examiner

200

IMPLEMENTING A TASK SCHEDULER S210

IMPLEMENTING A WORK QUEUE FOR TASK EXECUTION S220

DATA FORMATTING WITH DATA TRANSFER UNITS S230

IMPLEMENTING MULTIPLE-BUFFERED I/O DATA BUFFERS S235

ACCUMULATING COMPUTATION OUTPUTS S240

ROUTING DATA USING NETWORK-ON-CHIP ROUTING S245

FIG. 2

TILE SUBSYSTEM AND METHOD FOR AUTOMATED DATA FLOW AND DATA PROCESSING WITHIN AN INTEGRATED CIRCUIT ARCHITECTURE

CROSS-REFERENCE TO RELATED APPLICATIONS

This application is a continuation of U.S. patent application Ser. No. 17/102,643, filed 24 Nov. 2020, which claims the benefit of U.S. Provisional Application No. 62/940,518, filed 26 Nov. 2019, and U.S. Provisional Application No. 63/049,674, filed 9 Jul. 2020, which are incorporated in their entireties by this reference.

TECHNICAL FIELD

The inventions described herein relate generally to the integrated circuitry architecture field, and more specifically to new and useful intelligent integrated circuits and methods of computing with the intelligent integrated circuit in the integrated circuitry architecture field.

BACKGROUND

Today, the various implementations of artificial intelligence and machine learning are driving innovation in many fields of technology. Artificial intelligence (AI) systems and artificial intelligence models (including algorithms) are defined by many system architectures and models that enable machine learning (deep learning), reasoning, inferential capacities, and large data processing capabilities of a machine (e.g., a computer and/or a computing server). These AI systems and models are often trained intensively to perform one or more specific tasks, such as natural language processing, image recognition, planning, decision-making, and the like. For example, a subset of these AI systems and models include artificial neural network models. The training of an artificial neural network model may, in many cases, require thousands of hours across the training cycle and many terabytes of training data to fine tune associated neural network algorithm(s) of the model before use.

However, once trained, a neural network model or algorithm may be deployed quickly to make inferences to accomplish specific tasks (e.g., recognizing speech from speech input data, etc.) based on relatively smaller datasets when compared to the larger training datasets used during the training cycle. The inferences made by the neural network model or algorithm based on the smaller datasets may be a prediction about what the neural network model calculates to be a correct answer or indication about a circumstance.

Still, while neural network models implementing one or more neural network algorithms may not require a same amount of compute resources, as required in a training phase, deploying a neural network model in the field continues to require significant circuitry area, energy, and compute power to classify data and infer or predict a result. For example, weighted sum calculations are commonly used in pattern matching and machine learning applications, including neural network applications. In weighted sum calculations, an integrated circuit may function to multiply a set of inputs ($x_i$) by a set of weights ($w_i$) and sum the results of each multiplication operation to calculate a final result (z). Typical weighted sum calculations for a machine learning application, however, include hundreds or thousands of weights which causes the weighted sum calculations to be computationally expensive to compute with traditional digital circuitry. Specifically, accessing the hundreds or thousands of weights from a digital memory requires significant computing time (i.e., increased latency) and significant energy.

Accordingly, traditional digital circuitry required for computing weighted sum computations of a neural network model or the like tend to be large to accommodate a great amount of digital memory circuitry needed for storing the millions of weights required for the neural network model. Due to the large size of the circuitry, more energy is required to enable the compute power of the many traditional computers and circuits.

Additionally, these traditional computers and circuits for implementing artificial intelligence models and, namely, neural network models may be suitable for remote computing processes, such as in distributed computing systems (e.g., the cloud), or when using many onsite computing servers and the like. However, latency problems are manifest when these remote artificial intelligence processing systems are used in computing inferences and the like for remote, edge computing devices or in field devices. That is, when these traditional remote systems seek to implement a neural network model for generating inferences to be used in remote field devices, there are unavoidable delays in receiving input data from the remote field devices because the input data must often be transmitted over a network with varying bandwidth and subsequently, inferences generated by the remote computing system must be transmitted back to the remote field devices via a same or similar network. Additionally, these traditional circuit often cannot manage the computing load (e.g., limited storage and/or limited compute) and may often rely on remote computing systems, such as the cloud, to perform computationally-intensive computations and store the computation data (e.g., raw inputs and outputs). Thus, constant and/or continuous access (e.g., 24×7 access) to the remote computing systems (e.g., the cloud) is required for continuous operation, which may not be suitable in many applications either due to costs, infrastructure limitations (e.g., limited bandwidth, low grade communication systems, etc.), and the like.

Implementing AI processing systems at the field level (e.g., locally at the remote field device) may be a proposed solution to resolve some of the latency issues. However, attempts to implement some of these traditional AI computers and systems at an edge device (e.g., remote field device) may result in a bulky system with many circuits, as mentioned above, that consumes significant amounts of energy due to the required complex architecture of the computing system used in processing data and generating inferences. Thus, such a proposal without more may not be feasible and/or sustainable with current technology.

Accordingly, there is a need for a deployable system for implementing artificial intelligence models locally in the field (e.g., local AI), and preferably to be used in edge devices, that do not result in large, bulky (edge) devices, that reduces latency, and that have necessary compute power to make predictions or inferences, in real-time or substantially real-time, while also being energy efficient.

The below-described embodiments of the present application provide such advanced and improved integrated circuits and implementation techniques capable of addressing the deficiencies of traditional systems and integrated circuit architectures for implementing AI and machine learning.

BRIEF SUMMARY OF THE INVENTION(S)

In one embodiment, a tile subsystem of a multi-tile mixed-signal integrated circuit includes a plurality of distinct tile computing circuits, wherein each of the plurality of distinct tile computing circuits include storage that stores fixed-length programmations; a token-based task scheduler that: tracks a state of each of the plurality of distinct tile computing circuits based on detecting one or more of a plurality of distinct tokens emitted by one or more of the plurality of distinct tile computing circuits; and identifies a distinct computation task of a plurality of distinct computation tasks based on the detecting of the one or more of the plurality of distinct tokens emitted within the tile subsystem; and a work queue comprising a data buffer, wherein the work queue: stores a plurality of distinct fixed-length programmations, wherein each one of the plurality of distinct fixed-length programmations is associated with one or more of the plurality of distinct computation tasks; and transmits one of the plurality of distinct fixed-length programmations to one or more of the plurality of distinct tile computing circuits based on the identification of the distinct computation task by the token-based task scheduler.

In one embodiment, an execution of the one of the plurality of distinct fixed-length programmations by the one or more distinct tile computation circuits causes the one or more distinct tile computation circuits to perform one or more of: accessing input data at an on-tile input data buffer and completing one or more computations with the input data, and outputting one or more computation outputs of the one or more distinct tile computation circuits to an on-tile output data buffer.

In one embodiment, the tile subsystem includes one or more data transfer circuits comprising one or more address generation units that compute one or more memory addresses for accessing input data from an off-tile memory array for one or more impending computations by the one or more distinct tile computation circuits.

In one embodiment, the token-based task scheduler further tracks a state of the one or more data transfer circuits and identifies a distinct data transfer task based on the plurality of distinct tokens emitted within the tile subsystem of the mixed-signal integrated circuit.

In one embodiment, each one of the plurality of distinct fixed-length programmations is further associated with one or more of a plurality of distinct data transfer tasks, the work queue transmits one of the plurality of fixed-length programmations associated with one of the plurality of distinct data transfer tasks to the one or more data transfer circuits based on the identification of the distinct data transfer task by the token-based task scheduler.

In one embodiment, an execution of the fixed-length programmations by the one or more data transfer circuits causes one of (a) a transfer of computation input data from an off-tile memory array to an on-tile input buffer of the one or more distinct tile computation circuits and (b) a transfer of computation output data from an on-tile output buffer of the one or more tile computation circuits.

In one embodiment, an execution of the fixed-length programmations by the one or more data transfer circuits causes: a transfer of computation input data from a memory array into the tile subsystem; and the one or more data transfer circuits to format the computation input data by one or more of interleaving, de-interleaving, and padding the computation input data.

In one embodiment, the one or more distinct tile computing circuits comprises one or more of a matrix multiply accumulator and a streaming arithmetic logic circuit.

In one embodiment, each of the one or more distinct tile computation circuits includes an accumulator that aggregates a sequence of computation outputs from a processing circuit of a respective one of the one or more distinct tile computation circuits.

In one embodiment, the accumulator applies one or more activation functions to the sequence of computation outputs.

In one embodiment, the token-based task scheduler comprises multiple token tracking tiers, wherein each distinct one of the multiple tiers tracks a distinct token emitted within the tile subsystem, and the identifying the distinct computation task includes combining a count of the distinct tokens of two or more of the multiple token tracking tiers.

In one embodiment, the tile subsystem includes one or more network-on-chip routers that transport one or more of data packets and digital tokens into and out of the tile subsystem.

In one embodiment, the one or more network-on-chip routers define a part of a network-on-chip system that interconnects the tile subsystem to an array of multiple distinct tiles of the mixed-signal integrated circuit, and a topology of the network-on-chip system comprises one of a ring topology, a mesh topology, and a crossbar topology.

In one embodiment, a computing tile of a multi-tiled integrated circuit includes a plurality of distinct tile computing circuits, wherein each of the plurality of distinct tile computing circuits is configured to receive fixed-length instructions; a token-informed task scheduler that: tracks one or more of a plurality of distinct tokens emitted by one or more of the plurality of distinct tile computing circuits; and selects a distinct computation task of a plurality of distinct computation tasks based on the tracking; and a work queue buffer that: contains a plurality of distinct fixed-length instructions, wherein each one of the plurality of distinct fixed-length instructions is associated with one or more of the plurality of distinct computation tasks; and transmits one of the plurality of distinct fixed-length instructions to one or more of the plurality of distinct tile computing circuits based on the selection of the distinct computation task by the token-informed task scheduler.

In one embodiment, the computing tiles includes one or more data transfer circuits comprising one or more address generation units that compute one or more memory addresses for accessing input data from an off-tile memory array for one or more impending computations by the one or more distinct tile computation circuits.

In one embodiment, the token-informed task scheduler further tracks a state of the one or more data transfer circuits and identifies a distinct data transfer task based on detecting the plurality of distinct tokens emitted within the computing tile.

In one embodiment, a method of implementing a computing tile of a multi-tiled integrated circuit includes tracking by a token-informed task scheduler, one or more of a plurality of distinct tokens emitted by one or more of a plurality of distinct tile computing circuits, wherein each of the plurality of distinct tile computing circuits is configured to receive fixed-length instructions; and selecting, by the toke-informed task scheduler, a distinct computation task of a plurality of distinct computation tasks based on the tracking; and implementing a work queue buffer that contains a plurality of distinct fixed-length instructions, wherein each one of the plurality of distinct fixed-length instructions is associated with one or more of the plurality of distinct computation tasks; and transmitting, by the work queue, one of the plurality of distinct fixed-length instructions to one or more of the plurality of distinct tile computing circuits based on the selection of the distinct computation task by the token-informed task scheduler.

BRIEF DESCRIPTION OF THE FIGURES

FIG. 2 illustrates an exemplary method 200 of data processing using a mixed-signal integrated circuit in accordance with one or more embodiments of the present application.

DESCRIPTION OF THE PREFERRED EMBODIMENTS

Figure 1:
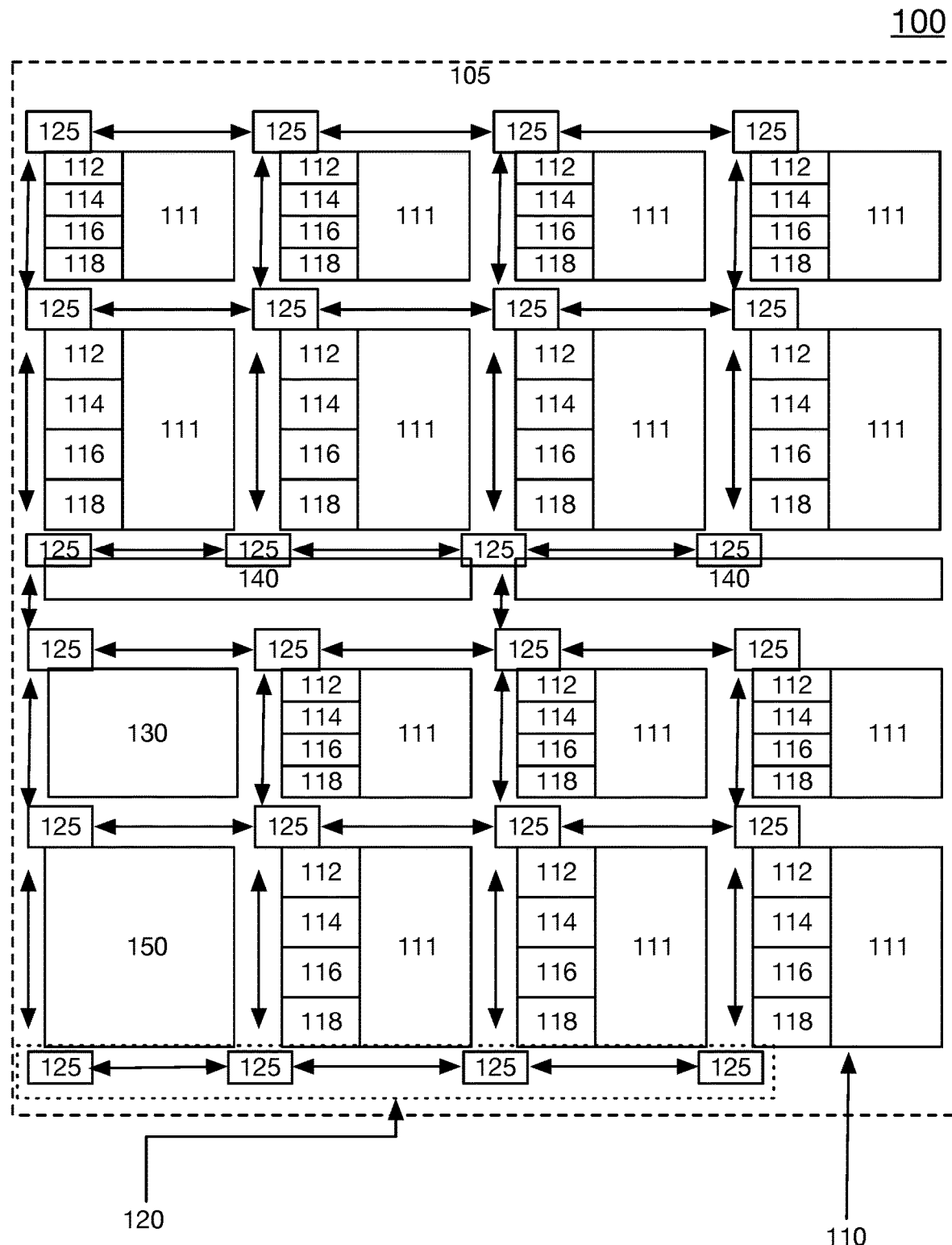
FIGS. 1-1A illustrates a schematic of an intelligence integrated circuit 100 in accordance with one or more embodiments of the present application.

The following description of preferred embodiments of the present application are not intended to limit the inventions to these preferred embodiments, but rather to enable any person skilled in the art of to make and use these inventions.

1. Intelligence Processing Overview

Embodiments of the present application provide a flexible and reprogrammable system that can be programmed to accommodate various computationally-intensive applications or programs of varying complexity and size. While a physical configuration of an integrated circuit architecture according to one or more embodiments of the present application may remain the same or substantially the same, disparate processing elements within the architecture may be programmed to handle multiple applications or one or more sections of a single application.

Further, an implementation and particular arrangement of the storage devices implemented within one or more embodiments of the present application provide several technical benefits over state-of-the-art integrated circuits, including reducing a total requirement of memory or storage required for handling data-intensive applications or programs. For instance, in one embodiment, a main (large) buffer may be provided to receive input data (e.g., raw input data or data from an upstream layer or source) and each of a plurality of disparate local buffers may be arranged together with a computing element (e.g., a matrix multiply accelerator) in. In such embodiment, each local buffer may be arranged adjacent to or in an immediate vicinity of the computing element for fast access and therefore, efficient processing of input data from the main buffer.

Additionally, such an arrangement may allow for asynchronous processing of data along a data processing pipeline thereby enabling multiple segments of data to be processed at a same time and possibly in different stages along the pipeline. The requirement for duplication of data may be significantly reduced.

Additionally, one or more embodiments of the present application may function to implement a token-driven data processing system in which a central process control may not be required for driving transactions between data producing computing elements and data consuming computing elements of an integrated circuit.

Specifically, in one or more embodiments, an integrated circuit of the present application may include an architecture that may trigger microprocessor (sometimes referred to herein as "nano-processor") programs and/or applications using tokens. While, in many embodiments described herein, the tokens may be used for automatically triggering an execution and/or implementation of programs or applications, in various implementations the tokens may be used to trigger other units within the integrated circuit. A few examples may include, using the tokens to trigger finite state machines, trigger a release of a packet or a work-queue item, trigger the generation of another token, initiate a data processing or computation, and/or the like. There may be limitless applications of the token-based governance module (sometimes referred to herein as the flow scoreboard module or task scheduler), described in several of the embodiments, for automatically triggering any type and/or any number of functions/operations with the integrated circuit.

In a preferred embodiment of the present application, the integrated circuit architecture may include a network-on-chip system that enables a communication and/or passing of tokens between distinct components of the integrated circuit. However, it shall be noted that any suitable token communication scheme and/or interconnect may be used including, but not limited to, serial communication buses or the like. An internally recognized constraint in some of the embodiments of the token-based integrated circuit architecture may include constraints in ordering and/or latency between a token and an event or request that the token may represent. For instance, in one embodiment of the present application, a token may not be released and/or generated (irrespective of an interconnect) until an associated triggering event is completed (e.g., an emptying of a local data buffer, a computation by an MMA or the like against input data, and/or any suitable event). In yet another embodiment, a token may be generated and/or released in advance of an associated triggering event if the early release of the token would not cause ordering constraints to be violated. Accordingly, in several of the embodiments of the present application, it shall be noted that the tokens can be deployed in any suitable manner to achieve a token-based control of the flow of data and/or the processing of data throughout an integrated circuit.

Additionally, the token-based governance module described herein may generally function to enable a token-based control by tracking tokens and token triggering conditions and the like. The token-based governance module may have configurable constraints so that triggering may also depend on a state of a local unit or circuit and not only based on a number of tokens identified or received. That is, in several embodiments of the present application, data flow, data processing, one or more operations/functions and the like may be governed based on the release or generation of tokens, it shall be noted that simply determining and/or identifying a state of a component of the integrated circuit and/or identifying a state of a process or operation within the integrated circuit may serve as a triggering event for yet automating another operation, function, process, or flow. For instance, a state of the utilization (e.g., depth) and/or capacity of one or more work queues may function as a triggering event. A technical benefit of such embodiments may be that an operation may only run when computing resources (e.g., space with the one or more work queues) that may be required are available. Accordingly, the embodiments of the present application may provide a flexibility in how events and/or dependencies are configured that trigger an automated operation, function, or process and therefore, allow for the generation of more complex programs or applications that use greater resources or resources more efficiently, which improves an operating efficiency of the one or more systems described herein by reducing a number of events that need to be generated in order to perform some action.

1.1 Overview Tile Subsystem for Dataflow Architecture Overview

In one or more embodiments, a mixed-signal computing tile array may have a number of challenges which may include how to assign a given task to the limited computing resources (e.g., available processing, memory, etc.), limited communication bandwidth between tiles, managing data flow of concurrent running tasks, determining when the dependencies for a task may have been met which may be a prerequisite of the task being able to execute, and decomposing tasks too large to fit into a single tile such that the task may be divided among multiple tiles and the resultant outputs combined. The integrated circuit system's performance may be improved by efficient and coordinated communication between various tiles and circuits within a tile, scheduling a task to run as quickly as possible once the task dependencies have been met along with the computing resources being available, and starting tasks once a sufficient amount of input data has arrived from one or more of a data source and/or an upstream processing.

In one or more embodiments, a mixed-signal computing tile may include a computation unit that may perform mixed-signal computing, a task scheduling mechanism that may determine when a task needs to be executed, a work queue that may store the task along with any task execution or handling data that may be needed to execute the task (e.g., location of input data, location to store results, compute task programming, and any other information that may be required to execute the task), a memory array (e.g., SRAM array), a memory controller (e.g., SRAM controller) that may efficiently move data between the memory array and the computation unit(s), a processor (e.g., nano-processor), a networking unit (e.g., network on a chip (NoC)) that may allow a given tile to communicate with other components including other tiles of an integrated circuit, and circuitry that may enable the aforementioned components to collaborate in performing mixed-signal computing.

According to one or more preferred embodiments, the computation unit may include a matrix multiply accelerator (MMA), an input buffer that may perform a direct memory access (DMA) with the SRAM array using at least partially the SRAM control unit, an accumulator that may aggregate at least partial results from the MMA, an output buffer, a data formatter, and a calculation control element. In one or more preferred embodiments, components can be combined to provide a similar function, e.g., the accumulator, the output buffer, and the data formatter may be combined into a single component.

According to one or more preferred embodiments, the task scheduling mechanism may include a flow scoreboard (FSB) that may use tokens or similar indicia to track task dependencies and may automatically cause a task to execute via the work queue once at least part of the task dependencies are satisfied. As a non-limiting example of an FSB, reference is made to U.S. Pat. No. 10,521,395 issued on 31 Dec. 2019 titled "SYSTEMS AND METHODS FOR IMPLEMENTING AN INTELLIGENCE PROCESSING COMPUTING ARCHITECTURE", which is incorporated in its entirety by this reference.

According to one or more preferred embodiments, the work queue may store a fixed-length command (e.g., source data location, designation data location, location of compute unit programming, and the location of any other data required to execute a task) that, when issued, may initiate the execution of a task on a compute unit. In such an embodiment, the task may be represented in a smaller footprint format compared to a sequence of instructions. According to one or more preferred embodiments, once the task scheduling mechanism determines a task has the dependencies met, the task scheduling mechanism may communicate to the work queue that the task should be executed which in turn may cause the work queue to provide a command (e.g., a fixed-length command) to target compute unit that initiates an execution of the task on the target compute unit.

According to one or more preferred embodiments, the memory controller may perform a DMA with components in a given tile which may allow data to be transferred at a faster speed between the memory and components of the given tile. According to one or more preferred embodiments, the memory controller may contain an address generation unit that may interleave, de-interleave, and/or pad data, as needed, to be in the proper format for computation from storage or other computation elements. In such an embodiment, the memory usage and required communication may be reduced and memory buffer space may be saved.

2. Intelligence Processing Computing Architecture

Figure 1A:
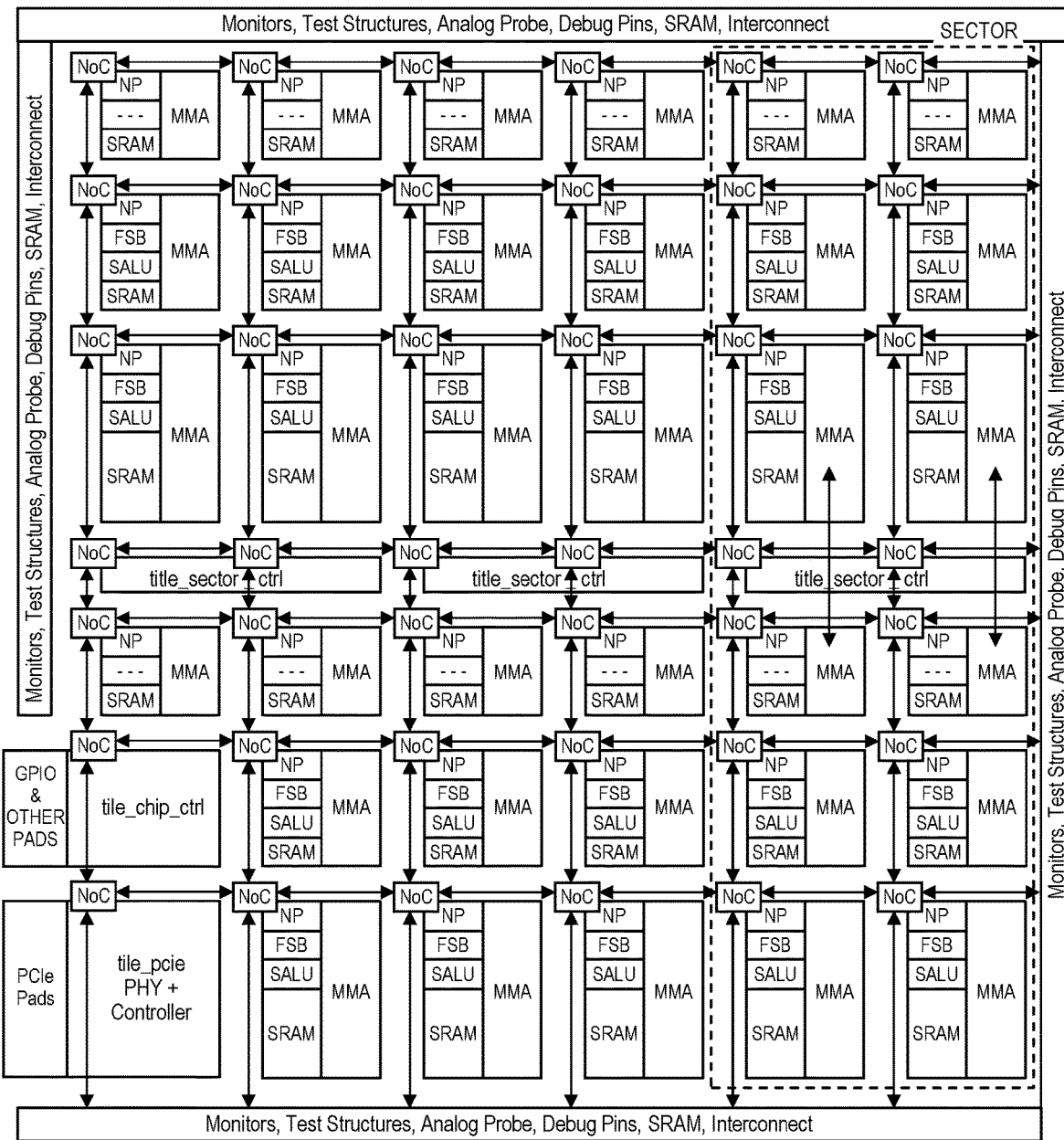

As shown in FIGS. 1-1A, an intelligence processing computing architecture 100 (or alternately referred to herein as an intelligence processing integrated circuit 100) for processing computationally-intensive programs and/or applications (e.g., machine learning applications, neural networks, etc.) includes an intelligence processing array 105 that includes a plurality of intelligence (computing) processing (tiles) units 110, a network on chip system 120 that includes a plurality of network-on-chip routers 125, an integrated circuit controller circuit 130, tile sector controller circuit 140, and a serial connection bus 150. Preferably, each of the plurality of intelligence processing units 110 includes a matrix multiply accelerator 111 (may also be referred to herein as an accelerator circuit), a computer processing circuit (e.g., a microprocessor, a nano-processor, or the like) 112, a flow scoreboard (token-based governance) module 114 (e.g., a task scheduling mechanism), a single instruction multiple data (SIMD) unit 116 (e.g., streaming arithmetic logic unit (SALU) or the like), and a local buffer (e.g., static random access memory (SRAM) or the like) 118. Additionally, in one preferred embodiment, each of 130, 140, and 150 may include a computer processing circuit 112, a flow scoreboard module 114, a SALU 116, and a local buffer 118. In one or more embodiments, the local data buffer 118 may sometimes be referred to herein as an on-tile memory or on-tile buffer indicating that the local data buffer 118 may be arranged within an intelligence processing tile 110 and in direct communication with various or one or more circuits, components, and/or modules within the intelligence processing tile 110.

FIG. 1A includes a further detailed embodiment of the intelligence processing computing architecture 100 and includes additional peripheral interconnects for interfacing with the intelligence processing array 105. For instance, test structures, monitors, analog probes, and/or any suitable peripheral device may be connected along or arranged along the periphery of the intelligence processing array 105 of the intelligence computing architecture wo.

While in one or more preferred embodiments an intelligence processing unit 110 may include a matrix multiply accelerator 111, a computer processing circuit 112, a flow scoreboard module 114, a SIMD unit 116, and a local buffer 118, it shall be noted that an intelligence processing unit 110 may include any suitable combination of circuits and modules and therefore, may exclude one or more of the aforementioned circuits and modules and/or may include any combination of the aforementioned circuits and modules without meaningfully departing from the scope of the inventions described in the present application. For instance, in some embodiments, an intelligence processing unit 110 may include or consist of a flow scoreboard module 114 and a local buffer 118 (SRAM) without computational circuitry or the like (e.g., computer processing circuit 112). In another example, an intelligence processing unit 110 may include or consist of a flow scoreboard module 114, a local buffer 118 (SRAM), and an off-chip interface (e.g., USB, PCIe, HDMI, MIPI-CSI, I2C, ethernet, Bluetooth, and/or any suitable off-chip interface component).

Additionally, or alternatively, while processing within the architecture 100 may include analog processing components or the like, it shall be noted that the embodiments of the architecture 100 may also enable digital processing with any suitable circuitry including, but not limited to, embedded Field Programmable Gate Arrays (eFPGA), Systolic arrays, floating point units, and/or the like.

The intelligence processing array 105 (intelligence accelerator) preferably includes the plurality of distinct intelligence processing units 110 that may function to work in cooperation to execute a computationally-intensive application or the like. In some embodiments, the intelligence processing array 105 may function to define one or more intelligence processing pipelines that enables a processing of raw input data and/or data from an upstream device or process to a final output state. In such embodiment, each stage (e.g., by one or more disparate intelligence processing units 110 or the like) of the intelligence processing pipeline may be defined by a disparate intelligence processing unit 110 that may be specifically programmed to execute a fraction of an application or program. Each of the disparate intelligence processing units no of the intelligence processing array 105 preferably functions to operate or compute independently of other or heterogeneous intelligence processing units 110 within the intelligence processing array 105. Accordingly, because each stage of an intelligence processing pipeline may be configured with its own processing section (e.g., intelligence processing unit no), each intelligence processing pipeline may function to processing input data independently along each stage within the pipeline thereby enabling considerable efficiencies in processing input. That is, asynchronous processing of data or raw input data may be achieved based on the independent processing and/or computations of respective intelligence processing units no.

Additionally, or alternatively, each of the one or more intelligence processing pipelines defined within the intelligence processing array 105 may be flexibly configured to enable the execution of disparate (non-dependent) applications or programs within the single array 105 or flexibly configured to enable the execution of disparate sections of a single application or a single program along various intelligence processing units no within the array 105. For instance, a first neural network application may be programmed along a first section of the intelligence processing array 105 that includes a first collection of intelligence processing units 110 and a second neural network application may be programmed along a second section of the intelligence processing array 105 that includes a second disparate collection of intelligence processing units no. In a second example, a single computationally-intensive application (e.g., a neural network or the like) may be partitioned into sub-applications (or programs) and each section programmed to a different intelligence processing unit 110 within an array 105. Additionally, or alternatively, in this second example, multiple sections of an application or multiple sub-applications may be programmed to a same intelligence processing unit no. In yet another example, a plurality of intelligence processing units 110 may be conglomerated to perform one or more sub-sections of a single application or a single program. That is, individual intelligence processing units 110 may be used to implement only a section of an application or a program and thus, the entirety of the application or the program is handled by a plurality of intelligence processing units no that each process only a section of the overall application or program. It shall be noted that the integrated circuit array 105 and/or each intelligence processing units 100 may function to compute the multiple distinct applications and/or the multiple distinct partitions of a single application or single program in parallel (i.e., at the same time), contemporaneously (i.e., processing within a common time period, nearly the same time, etc.), or synchronously (i.e., processing independently of other processes and/or processing units iio). Additionally, it shall be noted that any suitable and/or type of application or program may be partitioned along the intelligence processing array 105 including applications and/or programs that may be partitioned into multiple operational stages that may have dependencies that can be represented as tokens.

The plurality of intelligence processing (tiles) units no preferably function to execute an application or a program against some input data received from an upstream device or an upstream layer, such as a buffer or another intelligence processing unit no. As mentioned above, each of the plurality of intelligence processing units 110 includes a matrix multiply accelerator (e.g., a data processing circuit, or the like) 111, a computer processing circuit (e.g., a microprocessor) 112, a flow scoreboard module 114, a SIMD unit 116, and local data buffer 118 that enables each of the plurality of intelligence processing units 110 to accomplish and/or complete a processing of input data to output data and/or execute an application or program.

Each of the plurality of intelligence processing units no preferably functions to pull and/or accesses input data from its local buffer 118, compute against the input data at the matrix multiply accelerator in and output the results (output data) of the computation against the input data back into its local buffer 118 (or possibly to a local buffer of a downstream component or processing section).

In additionally and/or alternative embodiments of the present application, one or more distinct subsets (i.e., two or more) of the plurality of intelligence processing units 110 of the intelligence array may be clustered and/or conglomerated into a smaller chip (e.g., a chiplet, a system-in-a-package (SIP), 3D packaging, or the like) relative to the overall architecture 100. In such embodiments, a chiplet may be composed within the overall architecture 100 to make a full and/or independent chip. A technical benefit of such embodiments enables an enhanced level of customization of the architecture to be achieved.

In yet further embodiments, multiple integrated circuit architectures 100 may be combined and/or packaged together in a multi-chip architecture. In such embodiments, the multiple architectures 100 may be composed at a system or circuit board (panel) level. The interconnections between the multiple chips may be made using any suitable interconnect technique or interface, including PCIe or specially created bridge interfaces.

The flow scoreboard module 114 may preferably be implemented by a combination of one or more computing processing circuits and flow scoreboard sub-modules (e.g., a combination of a computer program and/or table executed by one or more processing circuits, etc.). Additionally, the flow scoreboard module 114 may include a plurality of interfaces for implementing a flow control of data flowing through the one or more intelligence processing pipelines and a control of the execution of programs or the applications being handled by the one or more intelligence processing pipelines of the intelligence processing array 105.

In a preferred embodiment, the flow scoreboard module 114 may include a configuration interface, a token interface, and a notification interface. The configuration interface of the flow scoreboard 114 may be used to read and write an internal state of the flow scoreboard module 114, such as to program trigger conditions. The token interface of the flow scoreboard 114 may enable the intelligence integrated circuit 100 to present tokens to the flow scoreboard 114. In response to the presentation of a token via the token interface, the flow scoreboard 114 may function to update its internal state, and when necessary, update the notification interface according to token parameter values (e.g., token count values or the like, as discussed in further detail in the method 300) and a configuration of the flow scoreboard 114. The notification interface of the flow scoreboard may be implemented by the flow scoreboard module 114 to indicate to the intelligence integrated circuit 110 that one or more conditions (or prerequisites) for executing one or more programs have been satisfied. It shall be noted that the notification interface of the flow scoreboard module 114 may function to trigger any number of operations within the intelligence integrated circuit no, for example, data transfer without an explicit program execution.

It shall be noted that the configuration interface, token interface, and/or notification interface may be implemented in any suitable manner including with a combination of modules executed by one or more processing circuits, such as a microprocessor.

The network on chip system 120 that includes a plurality of network-on-chip routers 125 that function to establish a communication network between the disparate components of the intelligence integrated circuit 100. In one embodiment, each of the chip routers 125 may include dedicated input and output links for receiving and transmitting communications in the North, South, East, and West directions along the architecture 100 and specifically, within the intelligence processing array 105. In some embodiments, the network on chip system 120 enables each of the disparate intelligence processing units 110 to pass data between them, such that when one intelligence processing unit no completes processing input data to generate an output, the one intelligence processing unit 110 may function to pass the output via one or more of the network routers of the network on chip system to another intelligence processing unit and/or allow another intelligence processing unit 110 to grab the output data. As one example, the digital tokens and/or data packets may be carried along the plurality of network routers of the network on chip system 120.

Additionally, or alternatively, each tile subsystem may include a portion of the network-on-chip system that allows a given tile subsystem to transport digital tokens emitted by the one or more on-tile circuits or components. For instance, one or more network-on-chip routers may be used to transport a token emitted by a computation element or unit to an on-tile task scheduler of the given tile.

The integrated circuit controller 130 preferably includes chip-level control logic, which includes boot logic, security features, clocking logic, and the like.

The tile sector controller circuit 140 preferably includes a high voltage portion or circuit of the intelligence processing computing architecture 100 that enables the reprogrammable non-volatile memories within the matrix multiply accelerator in.

The serial connection bus 150 preferably includes one of a universal serial bus (USB) port and a peripheral component interconnect express (PCI express) interface and/or any suitable high-speed. In a preferred embodiment, raw input data (e.g., raw image data or the like) and/or processed input data (e.g., from an upstream device, an upstream layer, etc.) may be received at the serial connection bus 150 and passed into the system via a primary or main buffer component. Additionally, or alternatively, input data received at the serial connection bus 150 may be passed either into a primary buffer of the intelligence processing integrated circuit 100 or directly into a local buffer 118 of an intelligence processing unit 100 via the network on chip system 120. Additionally, or alternatively, the primary buffer, which is sometimes referred to herein as a main buffer, may also be referred to as an off-tile (off-unit) memory or buffer. In particular, since the main buffer operating with the architecture 100 may be arranged remotely from and off of an intelligence processing tile 110, it may be considered an off-tile component.

Additionally, or alternatively, any suitable off-chip connection may be implemented for transmitting data into and/or out of an intelligence processing array 105 and/or throughout the intelligence integrated circuit 100. For instance, any suitable peripheral device including, but not limited to, an imaging device (e.g., a camera), a host system (e.g., a system on chip) or workstation, another intelligence integrated circuit, and/or the like.

Accordingly, it shall be noted that any type or kind of data including tokens may be passed along the serial connection bus 150 or other suitable off-chip connection/interface. For instance, data (e.g., results of computations or other outputs, etc.) from the intelligence integrated circuit 100 may be sent out to another device or system via the serial connection bus 150 or off-chip connection. Thus, a flow control, as described in the one or more embodiments herein, may be extended from the intelligence integrated circuit 100 to other devices, when operably connected or interfacing, in some manner. That is, in some embodiments, token-based flow control may be enabled between multiple intelligence integrated circuits 100 or between a device and host.

3. Tile Subsystem for Automated Dataflow Architecture|Method

As shown by way of example in FIG. 2, a method 200 for automated and intelligent processing of data by an intelligence processing mixed-signal integrated circuit (e.g., circuit 100) includes implementing a task scheduler (e.g., an FSB module) that tracks state data (e.g., data movement and processing completion states) of one or more components using tracking elements, such as tokens S210, controlling task execution via a work queue that is in operable communication with the task scheduler and that dispatches fixed-length commands to control one or more of the computation units, control unit, and/or data transfer units based on state data S220, formatting input data by one or more of interleaving, de-interleaving, and/or padding the input data for consumption or storage S230, accumulating computational results based on encoded values and applying one or more activation functions for neural network processing or the like S240. In one or more embodiments, the method 200 may optionally include implementing input and/or output buffers as multiple-buffered enabling parallelism in a storage and/or movement of data S235 and further, routing data throughout the mixed-signal integrated circuit using a network-on-chip routing system S245.

3.1 Task Scheduling

S210, which includes implementing a task scheduler, may function to implement task scheduling mechanism 320 to track state data of one or more components and activities of the integrated circuit and determine whether dependencies of a task have been met. In such embodiments, the task scheduling mechanism 320 may signal or communicate to the work queue 330 that the task should be executed when it is determined that dependencies for the task are satisfied.

In response to the work queue 330 receiving notification that a given task should be executed, S220, which includes controlling task execution, may function to implement the work queue 330 to automatically provide command or control instructions (e.g., a fixed-length command) to the compute unit input buffer controller 390 to initiate a DMA data transfer from memory array 340 to input buffer 314 using the memory controller 350.

S230, which includes formatting and/or padding the input data, prior to completing a data movement may function to format the input data by performing one or more of interleaving, de-interleaving, and/or padding the input data to be in a proper format for computation from storage or other computation elements. That is, contemporaneous with or during a transfer of the input data, one or more of the data transfer units (e.g., SRAM or SRAM controller) may function to augment the input data with padding values (i.e., values intended to be ignored during computation) and/or extract or remove extraneous data from the input data set. In a preferred embodiment, the formatting of the input data may be performed by the data transfer unit after the input data is transmitted or read from a memory array (or off-chip memory) and prior to being stored in an input data buffer or the like arranged within a computing tile.

Once the DMA data transfer and data formatting is complete, compute unit input buffer controller 390 may signal to calculate control 316 to initiate a mixed-signal computation which in turn may trigger computation unit core 312 to begin mixed-signal computation using input data accessed or provided from input buffer 314.

S240, which includes accumulating computational results based on encoded values and applying one or more activation functions, may function to implement the accumulator 318 to aggregate the results of the mixed-signal computation from computation unit core 312 based on a completion of the mixed-signal computation. In one or more embodiments, if an analog-to-digital converter or the like of the computation unit core 312 has not formatted the output data of the computation unit core 312 as well as applied one or more required activation functions for transformation the output data, the accumulator 310 may optionally function to format the output data together with applying one or more activation functions to the output data of computation unit core 312 and/or generally of the computation unit 310.

Upon accumulator 318 completing, compute unit output controller 380 may send the results of accumulator 318 to memory array 340 using memory controller 350 and/or to another processing component using networking unit 370.

4. Tile Subsystem for Dataflow Architecture System

Figure 3:
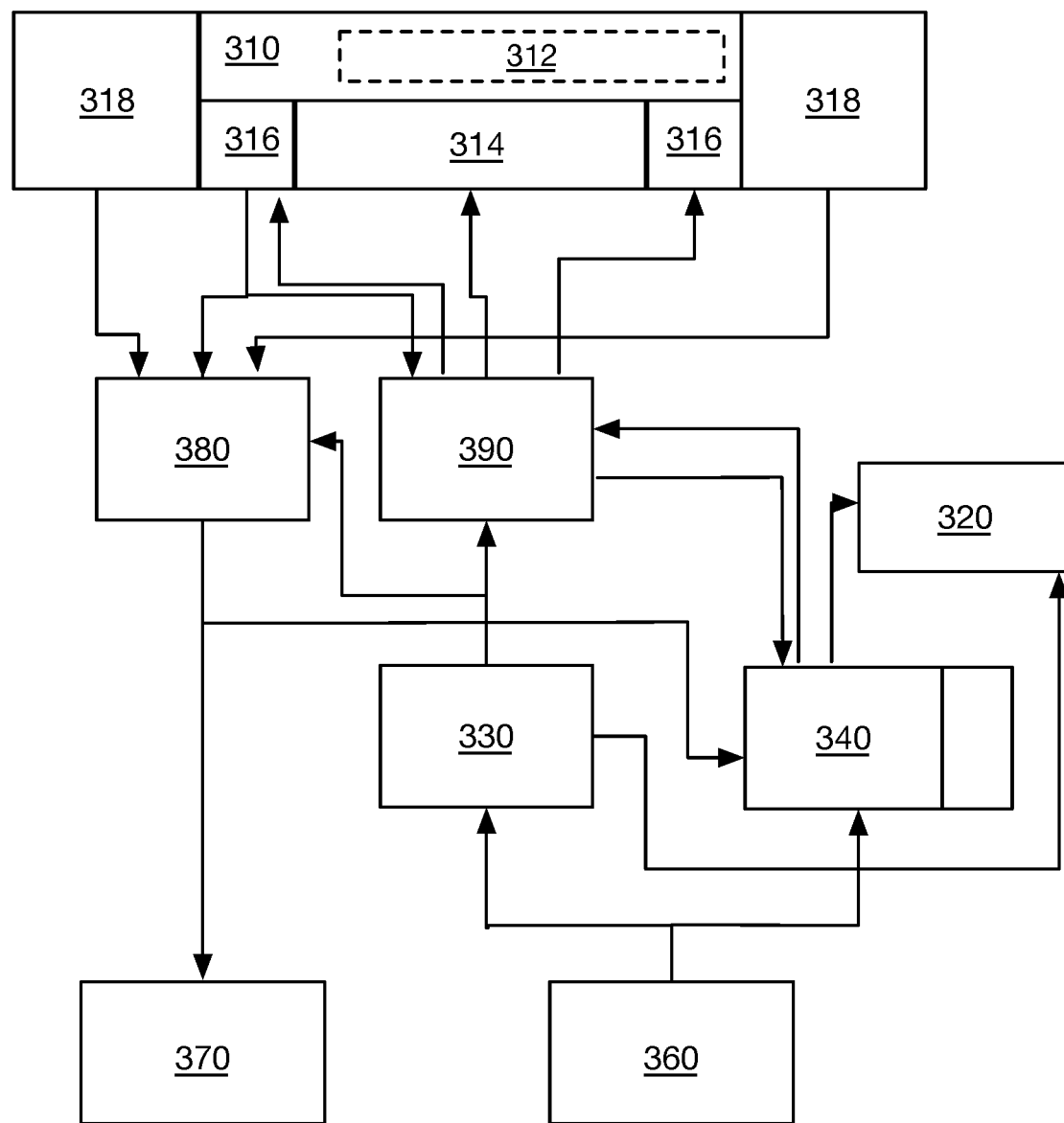
FIG. 3 illustrates an apparatus for a tile based dataflow architecture with an integrated circuit in accordance with one or more embodiments of the present application.

As shown by way of example in FIG. 3, a mixed-signal computing tile 300 may include computation unit 310, computation unit core 312, input buffer 314, calculate control 316, accumulator 318, task scheduling mechanism 320, work queue 330, memory array 340, memory controller 350, processor 360, networking unit 370, compute unit output controller 380, and compute unit input buffer controller 390.

According to one or more preferred embodiments, processor 360 may program task information to any combination of the work queue 330, memory controller 350, task scheduling mechanism 320, and any other component of mixed-signal computing tile 300.

According to one or more embodiments, components of mixed-signal computing tile 300 (e.g., 310, 320, 330, etc.) may be combined such that the individual functionality of each separate component may be at least partially maintained. According to one or more embodiments, multiple similar components may be present, e.g., computing tile 300 may have a plurality of computation units 310, computation unit 310 may have a plurality of accumulators 318, and/or the like. According to one or more embodiments, mixed-signal computing tile 300 may include additional processing components, e.g., digital signal processor (DSP) engine, image signal processor (ISP), universal serial bus (USB) controller, peripheral component interconnect express (PCIe) controller, and any other component capable of performing computation and/or communication.

4.1 Computation Unit 310

According to one or more embodiments, computation unit 310 may perform mixed-signal computing. In one or more preferred embodiments, computation unit 310 may contain a matrix multiply accelerator (MMA), e.g., matrix multiply accelerator in that performs computations in the analog domain.

According to one or more embodiments, computation unit 310 may include computation unit core 312 which may perform the mixed-signal processing. According to one or more preferred embodiments, when computation unit 310 contains an MMA, computation unit core 312 may include a programmable resistor array (e.g., flash array) and an analog-to-digital converter (ADC) that outputs an encoded value and/or a binary output value.

According to one or more embodiments, computation unit 310 may include input buffer 314 that may allow multiple components to simultaneously write to input buffer 314 (e.g., multiple-buffered). As a non-limiting example, computation unit 310 may be reading data for a current computation from input buffer 314 while the data for the next computation may be concurrently written to a different location of input buffer 314 and thus, in one or more embodiments, the input buffer 314 comprises a multiple-buffered configuration for parallel or simultaneous read and write functionalities. According to one or more preferred embodiments, input buffer 314 may have data written to input buffer 314 in a sequential manner while data may be read from the input buffer 314 in a parallel manner. According to one or more preferred embodiments, data stored in input buffer 314 may be transferred to computation unit core 312. According to one or more preferred embodiments, input buffer 314 may at least partially implement buffer tracking where tasks may communicate via shared buffers, as described in more detail in U.S. Provisional Patent Application 63/028,180 filed on 21 May 2020 titled "SYSTEMS AND METHODS FOR BUFFER TRACKING FOR DATAFLOW WITHIN AN INTEGRATED CIRCUIT ARCHITECTURE", which is incorporated in its entirety by this reference. In one or more embodiments, buffer tracking may be synonymous to double buffering.

According to one or more embodiments, computation unit 310 may include calculate control 316 that may at least partially control the processing within computation unit 310, e.g., start computation. According to an embodiment, calculate control 316 may signal to other components that the computation is completed. Thus, in one or more embodiments, the calculate control 316 adjacent to and/or in direct signal or contact communication with each of the compute unit core 312 and the input buffer 314 for controlling one or more operations thereof.

Additionally, or alternatively, in one or more preferred embodiments, the computation unit 310 may include a plurality of calculate controls 316 that each may be preferably arranged at either side of the input buffer 314. In such preferred embodiments, the plurality of calculate controls 316 may include a first calculate control 316 that may be arranged along a first side (e.g., left side) of the input buffer 314 and a second calculate control 316 that may be arranged along a second side (e.g., right side) of the input buffer. In such arrangement, a compute unit input buffer controller 390 may function to provide calculation start and/or calculation configuration signals to one or both of the first and second calculate controls 316.

The calculate control 316 may additionally, or alternatively, be in signal and/or electrical communication with the compute unit output controller 380 such that outputs (e.g., calculation done (left and/or right)) of the calculate control 316 may be direct to at least the compute unit output controller 380 and possibly to the compute unit input buffer controller 390.

According to one or more embodiments, computation unit 310 may include accumulator 318 that may at least partially aggregate a sequence or parallel outputs (e.g., offset binary results, etc.) from computation unit core 312. According to one or more embodiments, accumulator 318 may format the results into a format that may be required for one or more downstream one or more components of the mixed-signal computing tile 300 (or integrated circuit 100). According to one or more embodiments, accumulator 318 may include activation function circuitry or activation apply an activation function, e.g., Hard ReLU, Hard Sigmoid, Hard Tanh, etc., to data within computation unit 310. According to one or more embodiments, accumulator 318 may contain an output buffer that may at least partially implement buffer tracking.

Additionally, or alternatively, the accumulator 318 may be arranged adjacent to and/or in direct signal or contact communication with each of the compute unit computation unit 310 such that computation outputs of the compute unit core 312 may be aggregated and stored directly with the accumulator 318.

Additionally, or alternatively, the computation unit 310 may include a plurality of accumulators 318 including a first accumulator 318 and a second accumulator 310 that each may be arranged adjacently or at each side of the compute unit core 312. The accumulator 318 may be in signal and/or electrical communication with at least the compute unit output controller 380 and thereby provide the output data aggregated (formatted and transformed) from the compute unit core 312.

According to one or more embodiments, computation unit 310 may generate a token at the completion of a mixed-signal computation. According to a preferred embodiment, a mixed-signal computation may send a token to another component, e.g., task scheduling mechanism 320, networking unit 370, and any other component capable of receiving a token.

4.2 Task Scheduling Mechanism 320

According to one or more embodiments, task scheduling mechanism 320 may track task dependencies and once a prerequisite number and/or a combination of dependencies have been satisfied for the task, the task scheduling mechanism 320 may generate a signal to indicate the prerequisite number and/or combination of dependencies have been satisfied. That is, in one or more embodiments, the task scheduling mechanism 320 may function as a programmable dependency management unit that may be dedicated to detecting tokens or similar indicia that can be counted and/or combined to indicate a completion of all processing, a status of one or more data buffers, and data movement required for a subsequent (or sometimes, parallel) operation to begin (e.g., maintain and communicate producer-consumer relationships between components, etc.). As a non-limiting example, the task dependencies may include input data arriving at the computation unit, output buffer capable of holding the results becoming available, required compute processing being available, tiles programming being stored within the tiles memory, and any other requirement for a task to complete successfully. In one or more preferred embodiments, when the task dependencies are satisfied, the scheduling mechanism 320 may then communicate to work queue 330 that the task may be executed. Preferably, the signal to the work queue 330 includes a program identifier and/or a program value that the work queue 330 should cause to initiate and/or execute. In one or more embodiments, task scheduling mechanism 320 may track data relating at least to a state of one or more data buffers, a state of utilization and/or operation of the compute unit core 312, and/or movements of data within mixed-signal computing tile 300 and/or the integrated circuit 100.

In one or more preferred embodiments, task scheduling mechanism 320 (sometimes referred to herein as the "task scheduler") may include an FSB module that uses tokens to track task dependencies and once the task dependencies as indicated by token count have been met, the FSB module may dispatch a command which indicates that task dependencies have been met to another component (e.g., work queue 330). In one or more embodiments, an FSB module may be configured to track tokens in a tiered structure such that each tier may track a distinct token and/or event. According to one or more preferred embodiments, each component in the tile (e.g., compute unit, SRAM, SALU, NOC, processor, etc.) may have a separate or distinct FSB module. In one or more variant embodiments, the multiple distinct tiers of the task scheduler (i.e., the FSB module) may be counted and/or considered in combination (e.g., be unified) to allow multiple levels of combination of events. That is, in such variant embodiments, the task scheduling mechanism 320 may combine distinct tokens across the multiple levels to achieve a triggering event and/or achieve a necessary token count for causing an execution of a program or the like. According to another embodiment, the FSB module may be shared by multiple components of a tile or integrated circuit.

Any structure may be used to implement task scheduling mechanism 320 so long as the structure may track task dependencies and create a signal when the dependencies are met. As a non-limiting example, task scheduling mechanism 320 may be implemented with a processor running assembly code that tracks task dependencies and create a signal when the dependencies are met. For another non-limiting example, task scheduling mechanism 320 may be implemented with a finite state machine (FSM) that tracks task dependencies and creates a signal when the dependencies are met.

4.3 Work Queue 330

According to one or more embodiments, work queue 330 may store fixed-length commands that may allow execution of a task and the commands may include parameters such as source data location, destination data location, location of compute unit programming, and the location of any other data required to execute a task. In such embodiments, when a component (e.g., task scheduling mechanism 320) indicates that a task should be executed, work queue 330 may initiate the task to be executed in another component (e.g., computation unit 310) by providing a fixed-length command that is pending with the work queue 330. According to one or more preferred embodiments, once a task is executed, the task may be removed from the work queue 330.

According to one or more preferred embodiments, when task scheduling mechanism 320 signals that a task should be ran, work queue 330 may initiate the task to be executed in at least the computation unit 310 by triggering the compute unit input buffer controller 390 to initiate a DMA data transfer from memory array 340 to input buffer 314 using the memory controller 350. Once the DMA data transfer is complete, work queue 330 may initiate the mixed-signal computation by signaling to input buffer controller 390 to initiate computation by signaling calculate control 316. According to one or more embodiments, the signal to initiate a task may be a token, a packet, a dedicated signal line, or any other way to communicate that a task is ready to be initiated. In one or more embodiments, the signal may be a token-induced signal since the signal may be produced in response to a pre-requisite token count and/or a token combination at the task scheduling mechanism 320.

According to one or more preferred embodiments, work queue 330 may be configured and/or programmed by a processor. According to one or more embodiments, work queue 330 may be configured and/or programmed by an FSM.

According to one or more embodiments, work queue 330 may access the register file of the processor directly which may reduce the burden of moving data into and out of the register file. According to one or more embodiments, work queue 330 may contain commands of any fixed-length or any variable length.

In a variant implementation in which the work queue 330 may function to receive a variable length command, the work queue may function to partition and/or convert the variable-length command into multiple distinct fixed-length commands to fit the command store of the computational elements receiving programmation from the work queue 330. In such embodiments, the computational elements, such as the compute unit core 312 may have fixed programmation for each of a plurality of stages of their processing.

Additionally, or alternatively, commands within the work queue 330 may be enqueued allowing for compact transportation through an integrated circuit system, as needed.

According to one or more preferred embodiments, each component in the tile (e.g., compute unit, SRAM, SALU, NOC, processor, etc.) may have a separate work queue 330. In another embodiment, the work queue 330 may be shared by one or more of the components of the tile or integrated circuit.

It shall be noted that the operation of the task scheduling mechanism 320 together with one or more work queues 330 allows for several technical advantages including reducing an operational complexity and workload of computational elements within an integrated circuit system. For example, the task scheduling mechanism 320 and the one or more work queues 330 working together may function to eliminate a need for each computation element to have the overhead of a standard instruction storage, fetch and decode mechanism, which saves both circuitry area and power as well as (control flow) verification complexity of the system.

4.4 Memory Array 340

According to one or more embodiments, memory array 340 may be any structure that is capable of storing instructions and/or data that may be later retrieved. In one or more preferred embodiments, memory array 340 may contain at least partially SRAM.

4.5 Memory Controller 350

According to one or more embodiments, memory controller 350 may control read and/or write access to memory array 340. According to one or more preferred embodiments, memory controller 350 may contain an SRAM controller (SCTL).

According to one or more preferred embodiments, memory controller 350 may facilitate DMA between memory array 340 and a component. As a non-limiting example, memory controller 350 may allow input buffer 314 to perform DMA to load data from memory array 340. According to an embodiment, memory controller 350 may allow other memory access methods, e.g., memory stored at individual memory location. Additionally, or alternatively, memory controller 350 may pad the accessed data. As a non-limiting example, memory controller 350 may pad the perimeter of an image with 10 black pixels (i.e., value=0x0 for 8 bit space gray scale image). Additionally, or alternatively, memory controller 350 may format data. As a non-limiting example, data may need to be in a certain format to be stored or to be used by a computation component. According to one or more embodiments, memory controller 350 may include an address generation unit or circuit that may interleave, de-interleave, or pad data and further compute one or more memory addresses for one or more impending computations by any of the one or more tile computation circuits or units of a given tile.

4.6 Processor 360

According to one or more embodiments, processor 360 may process computationally-intensive programs and/or applications (e.g., machine learning applications, neural networks, etc.). In one or move embodiments, processor 360 may be a nano-processor, reduced instruction set computer (RISC) (e.g., RISC-V), microprocessor, or any other structure that may perform processing. According to one or more embodiments, processor 360 may be implemented as an FSM. In one or more embodiments, the processor 360 may function to generate a plurality of distinct tokens, which may be passed into a given tile via a data bus or the like. In such embodiments, the plurality of distinct tokens may be stored by one or more data transfer circuits or units and one or more computation circuits or units of the given tile and emitted or released within the given tile upon a satisfaction or occurrence of one or more events.

4.7 Networking Unit 370

According to one or more embodiments, networking unit 370 may allow components within mixed-signal computing tile 300 to communicate. According to one or more preferred embodiments, networking unit 370 may include a network on a chip (NoC). As a non-limiting example, NoC topologies may include rings, mesh, crossbars, and any other topology that allows components to communicate.

4.8 Compute Unit Output Controller 380

According to one or more embodiments, compute unit output controller 380 may route the output of computation unit 310 to a designation, e.g., memory controller 350, networking unit 370, and any other component capable of receiving data. According to a preferred embodiment, compute unit output controller 380 may generate a token that may indicate the task has completed. According to a preferred embodiment, a task completion token may be sent to another component, e.g., task scheduling mechanism 320, Networking Unit 370, and any other component capable of receiving a token.

4.9 Compute Unit Input Buffer Controller 390

According to one or more embodiments, compute unit input buffer controller 390 may receive a signal from work queue 330 indicating that a task may be executed. In response to receiving an indication that a task may be executed, compute unit input buffer controller 390 may request data from memory controller 350. In response to the request for data, memory controller 350 may send the requested data to unit input buffer controller 390. In response to receiving data from memory controller 350, unit input buffer controller 390 may send the data to input buffer 314. Once data is loaded into input buffer 314, compute unit input buffer controller 390 may initialize a computation by signaling calculate control 316.

5. Computer Program Product(s) Implementing Intelligence Processing and/or Token-Based Control of Intelligence Processing Integrated Circuit The systems and methods of the preferred embodiments and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the various methods described herein.

As a person skilled in the art will recognize from the previous detailed description and from the figures and claims, modifications and changes can be made to the preferred embodiments of the invention without departing from the scope of this invention defined in the following claims.

What is claimed is:

1. A system for controlling task execution on a computing tile of a multi-tiled integrated circuit, the computing tile comprising:
   an on-tile work queue that:
   (i) stores task instructions comprising distinct fixed-length programmations;
   (ii) regulates a transmission of each of the distinct fixed-length programmations to one or more task-performing circuits based on a token-induced signal that indicates to the on-tile work queue that all task-related prerequisites or all task-related dependencies for a target task have been satisfied; and
   (iii) transmits one or more distinct fixed-length programmations to the one or more task-performing circuits based on the on-tile work queue identifying the token-induced signal,
   wherein:
   the computing tile is arranged among a plurality of computing tiles on a mixed-signal integrated circuit; and
   each of the plurality of computing tiles includes: (a) a distinct token-informed scheduler, or (b) a distinct on-tile work queue.

2. The system according to claim 1, wherein:
   the on-tile work queue is shared by multiple, distinct task-performing circuits arranged on the computing tile, and
   the on-tile work queue stores the distinct fixed-length programmations for each of the multiple, distinct task-performing circuits.

3. The system according to claim 1, wherein the one or more task-performing circuits comprise one or more data transfer circuits comprising one or more address generation units that compute one or more memory addresses for accessing input data from one or more of an off-tile memory for one or more impending computations by the computing tile.

4. The system according to claim 3, further comprising:
   tracking a state of the one or more data transfer circuits to identify a completion of a distinct data transfer task based on detecting one or more distinct tokens emitted within the computing tile in response to the completion of the distinct data transfer task.

5. The system according to claim 1, wherein the token-induced signal is generated based on:
   (i) tracking one or more of a plurality of distinct tokens emitted by the one or more task-performing circuits of the computing tile; and
   (ii) identifying a distinct target task having all task-related prerequisites or task-related dependencies satisfied based on the tracking of the one or more of the plurality of distinct tokens.

6. The system according to claim 1, wherein an execution of a distinct fixed-length programmation by the one or more task-performing circuits causes the one or more task-performing circuits to perform one or more of:
   accessing input data at an on-tile input data buffer and completing one or more computations with the input data;
   outputting one or more computation outputs of one or more computation circuits to an on-tile output data buffer;
   accessing input data at an off-tile input data buffer and completing one or more computations with the input data; and
   outputting one or more computation outputs of the one or more computation circuits to an off-tile data buffer.

7. The system according to claim 1, wherein transmitting, by the on-tile work queue, the one or more distinct fixed-length programmations to the one or more task-performing circuits further comprises:
   routing the one or more distinct fixed-length programmations via an on-tile routing network; and
   removing the one or more distinct fixed-length programmations from a storage of the on-tile work queue once transmitted.

8. The system according to claim 1, wherein the on-tile work queue is in operable communication with:
   (1) a programmable token-informed scheduler that tracks one or more task dependencies or one or more task prerequisites for initializing the target task via token tracking, and
   (2) the one or more task-performing circuits of the computing tile.

9. The system according to claim 1, wherein the token-induced signal comprises a program identifier associated with at least one of the one or more distinct fixed-length programmations stored in the on-tile work queue.

10. The system according to claim 1, further comprising:
a token-informed scheduler that:
- (a) tracks a state of one or more data transfer circuits, and
- (b) schedules an execution of a distinct data transfer task with the on-tile work queue based on identifying a plurality of distinct tokens emitted within the computing tile.

11. The system according to claim 1, wherein
each of the plurality of computing tiles includes a distinct token-informed scheduler.

12. The system according to claim 1, wherein:
each of the distinct fixed-length programmations handled by the on-tile work queue is associated with one or more of a plurality of distinct data transfer tasks,
the on-tile work queue transmits one of the distinct fixed-length programmations associated with the one of the plurality of distinct data transfer tasks to one of the one or more data transfer circuits based on the token-induced signal comprising an identification of the distinct data transfer task.

13. The system according to claim 1, wherein
each of the plurality of computing tiles includes a distinct on-tile work queue.

14. A method for controlling task execution on a computing tile, the method comprising:
- (i) storing task instructions comprising distinct fixed-length programmations;
- (ii) regulating, by an on-tile work queue, a transmission of each of the distinct fixed-length programmations to one or more task-performing circuits based on a token-induced signal that indicates to the on-tile work queue that all task-related prerequisites or all task-related dependencies for a target task has been satisfied;
- (iii) transmitting one or more distinct fixed-length programmations to the one or more task-performing circuits based on the on-tile work queue identifying the token-induced signal; and
- (iv) implementing a token-informed scheduler that:
  - (a) tracks a state of one or more data transfer circuits, and
  - (b) schedules an execution of a distinct data transfer task with the on-tile work queue based on identifying a plurality of distinct tokens emitted within the computing tile.

15. The method according to claim 14, wherein:
the on-tile work queue is shared by multiple, distinct task-performing circuits arranged on the computing tile, and
the on-tile work queue stores the distinct fixed-length programmations for each of the multiple, distinct task-performing circuits.

16. The method according to claim 14, wherein the on-tile work queue is in operable communication with:
- (1) a programmable token-informed scheduler that tracks one or more task dependencies or one or more task prerequisites for initializing the target task via token tracking, and
- (2) the one or more task-performing circuits of the computing tile.

17. The method according to claim 14, wherein
the token-induced signal comprises a program identifier associated with at least one of the one or more distinct fixed-length programmations stored in the on-tile work queue.

18. A method of controlling task execution on an integrated circuit, the method comprising:
identifying, by a work queue of a computing tile of the integrated circuit, a token-induced communication that includes a program identifier of a target program to be executed;
identifying a fixed-length command stored by the work queue based on the program identifier; and
communicating the fixed-length command to a task-performing circuit in response to the token-induced communication, wherein the work queue stores a plurality of distinct fixed-length commands in association with a plurality of distinct programs,
wherein the computing tile is arranged among a plurality of computing tiles on the integrated circuit; and
each of the plurality of computing tiles includes: (a) a distinct token-informed scheduler, or (b) a distinct on-tile work queue.

19. The method according to claim 18, further comprising:
controlling task execution by a plurality of distinct task-performing circuits of the integrated circuit based on communications by the work queue of fixed-length commands to each of the plurality of distinct task-performing circuits.

* * * * *